United States Patent [19]

Belthle

[11] Patent Number: 4,860,501
[45] Date of Patent: Aug. 29, 1989

[54] METHOD OF AND MACHINE FOR GRINDING INTERNAL THREADS

[75] Inventor: Heinz Belthle, Aichwald, Fed. Rep. of Germany

[73] Assignee: Schaudt Maschinenbau GmbH, Stuttgart, Fed. Rep. of Germany

[21] Appl. No.: 71,156

[22] Filed: Jul. 8, 1987

[30] Foreign Application Priority Data

Jul. 19, 1986 [DE] Fed. Rep. of Germany ....... 3624472

[51] Int. Cl.⁴ .............................................. B24B 1/00
[52] U.S. Cl. ..................................................... 51/288
[58] Field of Search ............................. 82/1.5, 5, 5.5; 51/95 TH, 95 WH, 95 TG, 99, 288

[56] References Cited

U.S. PATENT DOCUMENTS 2,981,038  4/1961  Flanders ................................ 51/288
3,728,823  4/1973  Tomita ............................ 51/95 TG
4,557,078  12/1985  Brill ...................................... 51/325

FOREIGN PATENT DOCUMENTS 568655    1/1933   Fed. Rep. of Germany ........ 51/288
1057420  12/1965   United Kingdom .................. 51/288
1433369  11/1973   United Kingdom .................. 51/288
1536866  12/1978   United Kingdom ............ 51/95 TG

*Primary Examiner*—Frederick R. Schmidt
*Assistant Examiner*—Blynn Shideler
*Attorney, Agent, or Firm*—Peter K. Kontler

[57] ABSTRACT

The internal of a rotary workpiece, especially a ball thread, is ground with a CBN grinding wheel whose axis makes with the axis of the workpiece a grinding angle smaller than the lead angle of the thread to be ground. The profile of the grinding wheel is thereupon corrected by a diamond profiling roll whose axis makes with the axes of the grinding wheel an angle larger than the lead angle.

3 Claims, 4 Drawing Sheets

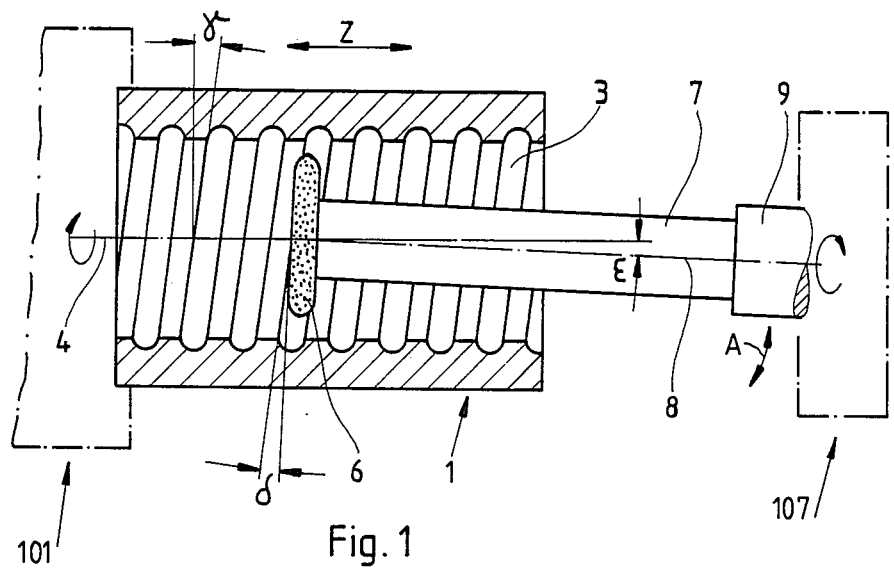
Fig. 1
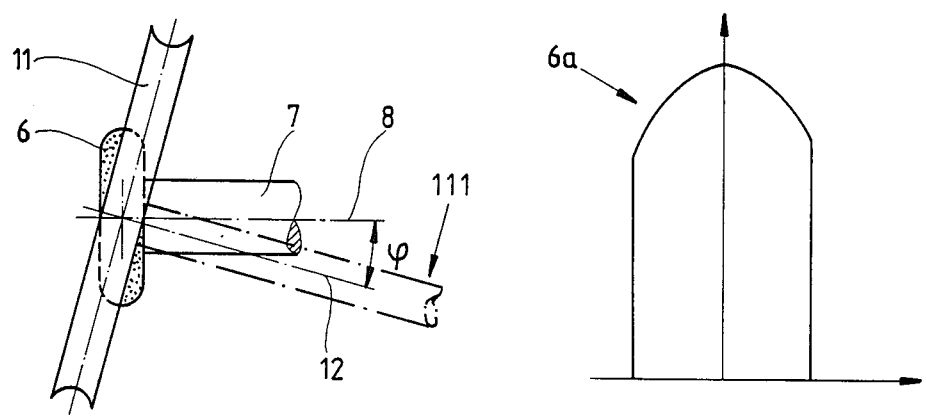
Fig. 2
Fig. 3

METHOD OF AND MACHINE FOR GRINDING INTERNAL THREADS

BACKGROUND OF THE INVENTION

The invention relates to improvements in methods and machines for grinding internal threads, especially ball threads.

Presently known machines for grinding internal threads in nuts and other types of workpieces normally employ grinding wheels which are made of corundum. Such grinding wheels are dressed, almost invariably, with radius dressing tools employing a single-point diamond. If, in some rare instances, the grinding wheel is dressed with a diamond profiling roll, the inclination of the axis of the roll with reference to the axis of the grinding wheel must conform to the lead angle. In the course of the grinding operation, the axes of the workpiece and grinding wheel also make an angle which equals the lead angle of the thread to be ground. Thus, when the working surface of the grinding wheel is being dressed by a diamond profiling roll, the axis of the dressing roll is parallel to the axis of the grinding wheel. This ensures that the profile of the roll can be accurately transferred onto the grinding wheel. In other words, the grinding angle (between the axes of the workpiece and grinding wheel during grinding) equals the lead angle (of the thread to be ground), and the dressing angle (between the axes of the grinding wheel and the rotary diamond profiling roll) equals zero.

The utilization of more effective cubic boron nitride (CBN) grinding wheels and their dressing with diamond profiling rolls is unwarranted for economical reasons or is plain impossible in connection with internal grinding in accordance with the above outlined conventional method. This is due to the fact that the arbor of the grinding spindle (the arbor actually carriers the grinding wheel) is too weak for transmission of forces which must be applied for grinding with a CBN grinding wheel and which must be applied to dress a CBN grinding wheel with a diamond profiling roll. The maximum diameter of the grinding spindle arbor is a function of the grinding angle and of the ratio of length of the thread to the thread core diameter. If the internal thread is long and thread core diameter is small, the diameter of the arbor of the grinding spindle is necessarily small and the arbor is so weak that it cannot transmit and/or standard forces which are required for efficient operation of a CBN grinding wheel and which developed when a CBN grinding wheel is dressed with a diamond profiling roll. It is further to be borne in mind that the inclination of the arbor is dependent upon the required grinding angle and its plane of contact with the internal thread is off center so that the arbor is even closer to the innermost portion of the internal thread, i.e., to the thread core diameter. An arbor whose diameter is small exhibits a number of serious drawbacks. Thus, the arbor has a pronounced tendency to vibrate so that it cannot be subjected to large radially oriented stresses. The output is unsatisfactory because the critical rotational speed of a small-diameter arbor is very low. Operation with CBN grinding wheels is not economical because such grinding wheels cannot be used to capacity due to the weakness of a small-diameter arbor, and the output of a corundum grinding wheel (particularly in comparison with that of a fully effective CBN grinding wheel) is equally unsatisfactory. As mentioned above, a relatively weak arbor cannot withstand stresses which develop during dressing of a CBN grinding wheel with a diamond profiling roll. This renders it necessary to increase the number of grinding machines and have each machine operate with a corundum grinding wheel at a relatively low output.

OBJECTS AND SUMMARY OF THE INVENTION

An object of the invention is to provide a novel and improved method of grinding internal threads in rotary workpieces in such a way that one and the same tool can be used to grind a variety of different threads.

Another object of the invention is to provide a method which renders it possible to simplify the mounting of the dressing tool for the grinding wheel.

A further object of the invention is to provide a method which renders it possible to employ a CBN grinding wheel for the grinding of internal threads.

An additional object of the invention is to provide a novel and improved machine for the practice of the above outlined method and to construct and assemble the machine in such a way that the position of the dressing tool need not be changed in the course of and/or preparatory to a dressing of the grinding wheel.

Another object of the invention is to provide the machine with novel and improved means for supporting and rotating the grinding wheel.

Still another object of the invention is to provide a machine wherein a universal dressing tool can be used to treat a variety of grinding wheels and wherein each of a short series of different grinding wheels can be used to grind a variety of different internal threads.

One feature of the present invention resides in the provision of a method of grinding an internal thread having a predetermined lead angle, especially a ball thread, in a rotary workpiece by means of a grinding wheel which is mounted on a rotary grinding spindle. The method comprises the steps of introducing the grinding wheel into the workpiece and maintaining the axes of the grinding spindle and the workpiece at a predetermined grinding angle which is smaller than the lead angle, and thereupon dressing the grinding wheel including correcting (altering) the profile of the grinding wheel. The dressing step can comprise contacting the grinding wheel with a rotary diamond profiling roll including maintaining the axes of the profiling roll and grinding spindle at a predetermind dressing angle greater than the lead angle of the internal thread.

The dressing step can include maintaining the axes of the profiling roll in a horizontal plane and inclining the axis of the grinding wheel with reference to such plane. The maintaining step can include locating the axis of the workpiece in the horizontal plane and inclining the axis of the grinding wheel (i.e., the axis of the grinding spindle) with reference to the horizontal plane.

Another feature of the invention resides in the provision of a machine for grinding an internal thread having a predetermined lead angle, especially a ball thread, in a rotary workpiece. The machine comprises means for removing material from the interior of the rotating workpiece including a rotary grinding spindle and a grinding wheel coaxially mounted on the spindle, means for supporting the spindle so that the grinding wheel is located in the workpiece and the axes of the spindle and workpiece make a predetermined grinding angle which is smaller than the lead angle, means for effecting a relative movement of the workpiece and grinding wheel in the axial direction of the workpiece, and means for dressing the grinding wheel including means for correcting the profile of the grinding wheel. The correcting means can comprise a diamond profiling roll and means for rotating the profiling roll as well as means for positioning the axes of the spindle and the roll at an angle which is larger than the lead angle.

The machine can be designed in such a way that the axes of the workpiece and profiling roll are horizontal, and such machine can comprise means for pivoting the grinding spindle with reference to the workpiece as well as with reference to the roll. The means for rotating the workpiece and the means for rotating the roll can comprise means for maintaining the axes of the workpiece and roll in a predetermined orientation, i.e., for holding the workpiece and the roll against pivotal movement and in a common horizontal plane.

The grinding wheel can contain cubic boron nitride, and the profiling roll of the dressing means can comprise a universal profilling roll, i.e., a roll which comprises a first portion serving to dress the aforediscussed grinding wheel and at least one additional portion serving to dress a wheel for the grinding of external threads or to dress a wheel for the grinding of cylindrical internal or external surfaces.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a workpeice which is being formed with an internal ball thread and further showing a portion of a grinding spindle and a grinding tool on the arbor of the spindle;

FIG. 2 illustrates the grinding tool of the machine of FIG. 2 during treatment by a diamond profiling roll;

FIG. 3 is an enlarged fragmentary end elevational view of the profile of the grinding tool upon completion of the profiling operation;

DESCRIPTION OF THE PREFERRED EMBODIMENTS

Figure 4:
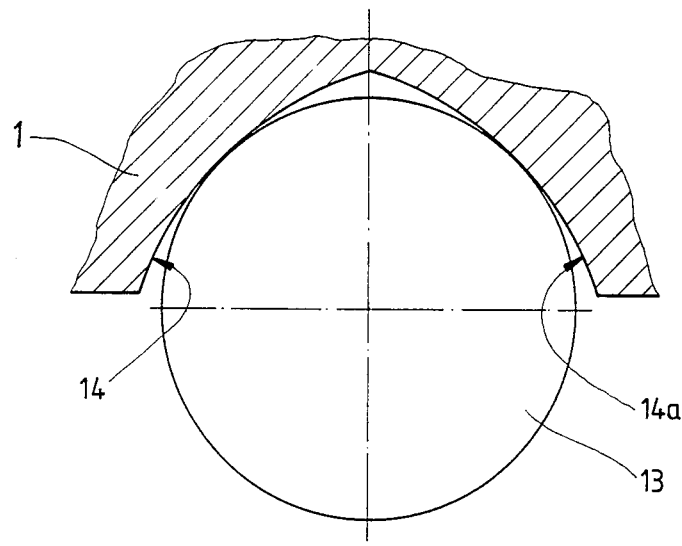
FIG. 4 is a greatly enlarged fragmentary axial sectional view of the workpiece upon completion of the grinding operation, further showing a ball in contact with the flanks of the surface surrounding the groove of the internal thread.

FIG. 1 shoows a workpiece 1 which constitutes a hollow rotary cylindrical nut having an internal ball thread 3. The means for supporting, orienting and rotating the workpiece 1 about its axis 4 comprises a headstock 101 (FIGS. 7 and 8) which supports the workpiece in such a way that the righthand end of the workpiece is open for introduction or extraction of a grinding wheel 6 mounted on the arbor 7 of a grinding spindle 9. The spindle 9 constitutes a means for rotating the grinding wheel 6 about an axis 8, and the spindle is mounted in a carriage or slide 107 capable of pivoting the parts 6, 7, 9 in directions indicated by a double-headed arrow A. The lead angle of internal thread 3 is shown at $\gamma$, and the axes 4 and 8 make a grinding angle $\epsilon$ which is smaller than the angle $\gamma$. The angle $\delta$ denotes the difference between the angle $\gamma$ and $\epsilon$. The workpiece 1 is or can be of the type capable of being used on ball spindle of steering systems for motor vehicles. The machine in which the workpiece 1 and the grinding wheel 6 can be mounted is or can be a modified version of a machine known at T3I which is made and distributed by the assignee of the present application. Reference may also be had to commonly owned U.S. Pat. No. 4,644,700 to Beyer et al. which discloses a pivotable carriage for several grinding spindles including a grinding spindle for an internal grinding wheel. Commonly owned U.S. Pat. No. 4,557,078 to Brill discloses a grinding machine with a dressing roll or wheel which is designed to treat the working surface of a grinding wheel. The disclosures of these patents, as well as of the commonly owned copending patent application Ser. No. 879,266, now Pat. No. 4,685,251 filed June 27, 1986 by Beyer et al., are incorporated herein by reference. The application of Beyer et al. shows a somewhat different machine which can be used for the practice of the method of the present invention, and more particularly a support which can rotate a workpiece about its axis as well as a tool carriage with a pivotably mounted spindle for an internal grinding gear.

When the machine embodying the structure of FIG. 1 is in use, the workpiece 1 is rotated about the axis 4 and the grinding wheel 6 is rotated about the axis 8. Furthermore, the carriage 107 moves the spindle 9, or the support 101 moves the workpiece 1, in one of the directions which are indicated by a double-headed arrow Z, namely in the direction of the axis 4. The grinding wheel 6 is a CBN (cubic boron nitrite) wheel which is fixedly secured to the respective end portion of the arbor 7.

In accordance with heretofore known proposals, the inclination of the axis 8 with reference to the axis 4 in the course of a grinding operation is such that the grinding angle equals the lead angle of the thread. As mentioned above, the method of the present invention provides that the lead angle $\gamma$ exceed the grinding angle $\epsilon$ by the angle $\delta$. Therefore, it is necessary to carry out a corrective dressing or profiling operation when the grinding of one or more workpieces 1 is completed. Such corrective dressing or profiling operation is carried out with a rotary diamond profiling or dressing wheel 11 which is mounted on and is rotatable by a shaft 111 driven by a motor, not shown in FIGS. 7 and 8. The shaft maintains the dressing tool 11 in a position such that the axes 8, 12 of the grinding spindle 9 and shaft 111 make a dressing angle $\psi$ greater than the lead angle $\phi$.

Thus, the lead angle $\phi$ is greater than the grinding angle $\psi$ but is smaller than the dressing angle $\psi$. When the dressing operation is completed, the grinding wheel 6 assumes a corrected ogival profile 6a of the type shown in FIG. 3 and corresponding to the internal ball thread 3 of the workpiece 1. This insures that, when the balls 13 (one shown in FIG. 4) which are interposed between the nut (workpiece 1) and a ball spindle (not shown) extend into the groove of the ball thread 3, they are in point contact with the flanks 14, 14a of the surface bounding the helical groove in the workpiece.

Figure 5:
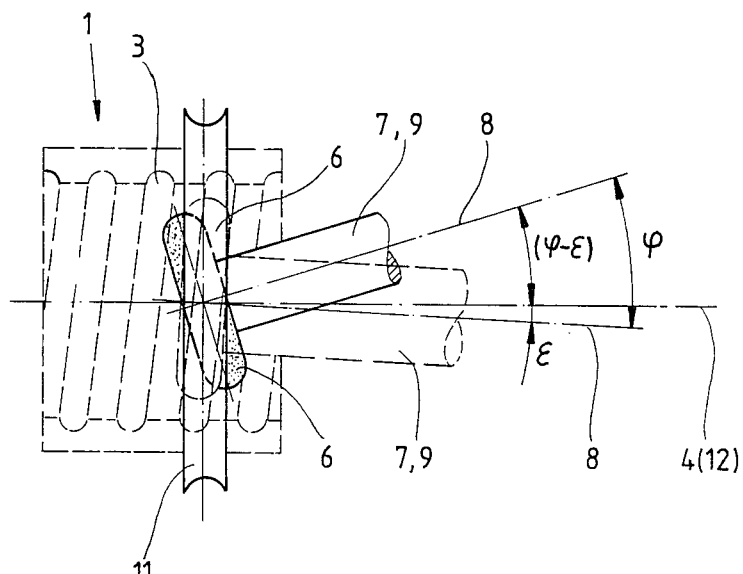
FIG. 5 illustrates by broken lines the position of the grinding tool with reference to the workpiece in the course of the grinding operation and by solid lines the position of the grinding tool with reference to the profiling tool in the course of the profile correcting operation.

FIG. 5 shows the positions of the workpiece 1, grinding wheel 6 and dressing tool 11. The positions which are indicated by broken lines are those assumed by the respective parts in the course of the grinding operation. The grinding wheel 6, the spindle 9 and the dressing tool 11 assume the solid-line positions of FIG. 5 in the course of the dressing or profile correcting operation. It will be seen that the orientation (inclination) of the workpiece 1 and of the dressing tool 11 need not be changed at all; only the grinding spindle 6 must be pivoted (arrow A in FIGS. 1 and 7) between the solid-line and broken-line positions of FIG. 5. This results in considerable simplification of the means for supporting and rotating the workpiece as well as of the construction of means for supporting and rotating the dressing tool. The axes 4 and 12 can remain in a common horizontal plane. Of course, and axis 12 of the dressing tool 11 is located behind the plane of FIG. 5 (see FIG. 7) because, when the grinding operation is completed and the grinding wheel 6 is to be subjected to a corrective profiling action, it is manipulated by the spindle 9 and carriage 107 to be extracted from the finished workpiece 1 and to be moved (arrow X in FIG. 7) behind the workpiece into engagement with the dressing tool 11. For grinding, the axis 8 of the grinding spindle 9 is pivoted downwardly with reference to the horizontal plane of the axis 4 of the workpiece 1 so that the axes 4 and 8 make the aforementioned grinding angle $\epsilon$. When the grinding operation is completed, the axis 8 of the grinding spindle 9 is pivoted upwardly through an angle $\phi$ to the position at an angle $\phi - \epsilon$ with reference to the horizontal plane of the axes 12 and 4. The grinding wheel 6 is then ready for corrective profiling by the dressing tool 11. Thus, the axis 8 of the grinding spindle 9 must be pivoted below the horizontal plane through a relatively small angle $\epsilon$ and upwardly above the horizontal through a large angle $\phi - \epsilon$. Total angular displacement of the axis between its two positions (during grinding and during dressing) equals $\psi$.

Figure 6:
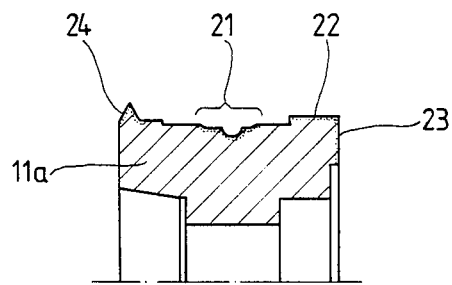
FIG. 6 is a fragmentary axial sectional view of a modified diamond profiling roll which can be used to correct the profile of the grinding wheel in the machine of FIGS. 1, 2 and 4.

FIG. 6 shows that the relatively simple single-purpose dressing tool 11 can be replaced with a more complex multiple-purpose dressing tool 11a. This dressing tool includes a first portion or section 21 which can be used in the same way as the dressing tool 11 of FIGS. 2 and 5 to correct the profile of the grinding wheel 6, a second portion or section 22 for the cylindrical generatrices of external grinding wheels, a third portion or section 23 for planar dressing of external circular grinding wheels, and a fourth section or portion 24 for dressing an external thread grinding wheel.

An important advantage of the improved method and machine is that it is now possible to greatly enlarge the diameter and hence the strength of the arbor 7. This, in turn, renders it possible to greatly enhance the strength of the location where the arbor 7 merges into the larger-diameter portion of the spindle 9, e.g., by resorting to a centering cone and by ensuring a pronounced surface-to-surface contact. The entire grinding spindle 9 can be much stronger than a grinding spindlewhich must be used in conventional machines with small-diameter arbors for grinding wheels whose axes make with the workpiece an angle that matches the lead angle. In effect, it is now possible to use a single spindle for the grinding of smaller or larger internal threads or, at the very least, to grind a full range of internal threads with a relatively small number of grinding spindles. Moreover, such stronger grinding spindles can carry more effective grinding wheels, particularly CBN grinding wheels. The critical rotational speed of larger and stronger grinding spindles is relatively high which renders it possible to employ CBN grinding wheels and to dress such grinding wheels with diamond profiling rolls. All this results in a higher output of an individual machine and renders it possible to substantially reduce the total number of machines in order to turn out the same number of finished workpieces.

The feature that the axes 4 and 12 of the workpiece 1 and the dressing tool 11 remain in a horizontal plane (i.e., that such axes need not be pivoted) contributes to simplicity of the machine. All that is necessary is to mount the grinding spindle 9 and its arbor 7 for pivotal movement with reference to the axes 4 and 12, namely downwardly with reference to the common horizontal plane of the axes 4 and 12 for grinding and upwardly with reference to such plane for dressing. This ensures that the axes 8 need not be pivoted through a large angle with reference to the horizontal plane because the downward pivotal movement (angle $\epsilon$ in FIG. 5) is small anyway, and the upward pivotal movement above the plane merely equals $\phi - \epsilon$.

The dimensions of the grinding spindle 9 and its arbor 7 can be readily selected in such a way that a CBN grinding wheel can be used to capacity.

The aforediscussed orientation of the axis 8 in the course of grinding and dressing operations ensures that the grinding spindle 9 is sufficiently strong to carry a CBN grinding wheel even if the aforediscussed ratio of the length of an internal thread to the thread core diameter is very unsatisfactory. Such situations arise quite frequently.

Additional simplification and savings can be achieved by using a universal dressing tool, such as the diamond profiling roll 11a of FIG. 6. This universal or multiple-purpose dressing tool can be used to profile grinding wheels for internal or external threads as well as for the profiling of internal or external circular grinding wheels. Dressing with a diamond profiling tool is faster than dressing in accordance with earlier proposals, and the strongly wear-resistant CBN grinding wheel does not require frequent profiling so that the interval of dressing per workpiece is reduced accordingly with attendant increase of the output of the grinding machine.

The optimum parameters for satisfactory operation of the machine (such as the grinding angle $\epsilon$ and the dressing angle $\phi - \epsilon$) for a particular workpiece are calculated by a computer in accordance with a predetermined algorithm. The same applies for adjustments of the dressing angle $\phi - \epsilon$ (the grinding angle $\epsilon$ remains constant) which must be altered as a result of a reduction of the radius of the grinding wheel 6 in response to dressing.

As mentioned above, an advantage of the improved method and machine is that the grinding spindle 9 can employ a stronger arbor 7. An additional advantage of the aforediscussed ratios $\epsilon<\gamma$ and $\phi>\gamma$ is that one achieves a so-called overlapping of the paths of grinding particles along the flanks of the thread profile which, in turn, results in a considerable improvement of surface finish. The extent of overlap of the paths of particles of grinding material along the flanks of the thread profile depends upon the magnitude of the correction angle $\delta$ (FIG. 1) which equals the difference of lead angle $\delta$ and grinding angle ($\delta=\gamma-\epsilon$).

Figure 7:
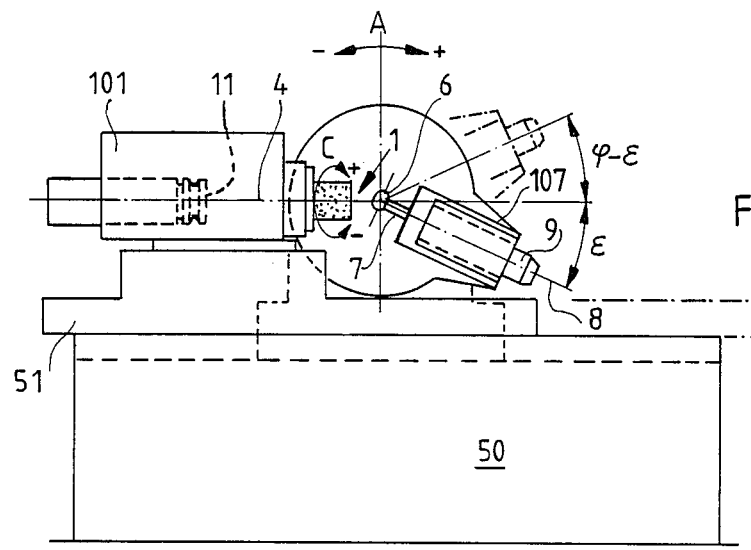
FIG. 7 is a schematic elevational view of an internal thread grinding machine which can be used for the practice of the improved method.
Figure 8:
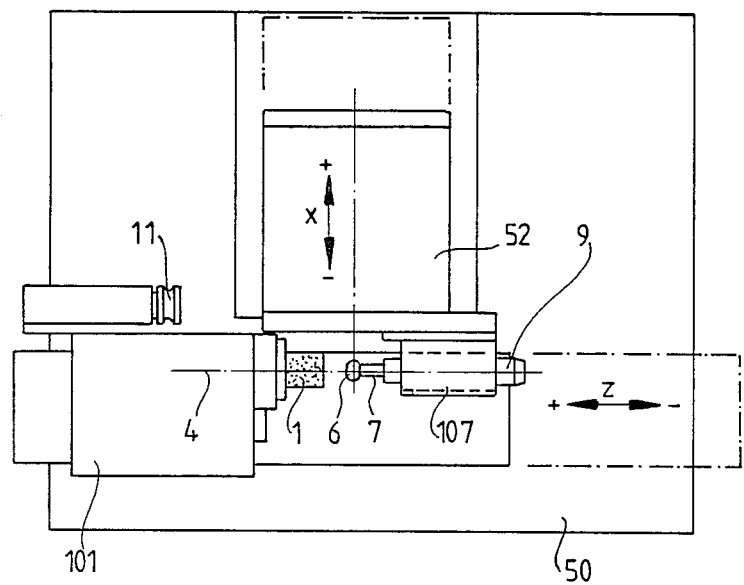
FIG. 8 is a plan view of the grinding machine.

FIGS. 7 and 8 show schematically a grinding machine which can be used for the practice of the improved method. The machine has a base or bed 50 for a slide or carriage 51 which supports and moves the headstock 101 for the workpiece 1. The motor which rotates the workpiece 1 is not specifically shown. The base 50 further supports a motor (not shown) which can rotate the dressing tool 11, and a grinding spindle head 52 which supports the spindle 9 and is movable in directions indicated by a doubleheaded arrow X in order to place the grinding spindle 9 and the grinding wheel 6 on the arbor 7 to a position for grinding (as actually shown in FIG. 8) or to a position for corrective profiling of the grinding wheel 6 by the dressing tool 11. The motors for rotating the grinding spindle 9 and for moving the head 52 in directions which are indicated by the arrow X are not shown in FIGS. 7 and 8. The slide 51 or the carriage 107 for the grinding spindle 9 is moved in one of the directions indicated by the arrow Z when the grinding wheel 6 performs a grinding operation. The carriage 107 is pivotable or tiltable between the solid-line position and the phantom-line position of FIG. 7 by a further motor, not shown in FIGS. 7 and 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my constribution to the art and, therefore, such adaptations should and are intended to be comprehended within the meaning and range of equivalence of the appended claims.

I claim:

1. A method of grinding an internal thread having a predetermined lead angle, especially a ball thread, in a rotary workpiece by means of a grinding wheel which is mounted on a rotary grinding spindle, comprising the steps of introducing the grinding wheel into the workpiece and maintaining the axes of the grinding spindle and the workpiece at a predetermined grinding angle smaller than the lead angle; and thereupon dressing the grinding wheel including correcting the profile of the grinding wheel, said correcting step comprising contacting the grinding wheel with a rotary diamond profiling tool including maintaining the axes of the profiling tool and grinding wheel at a predetermined dressing angle greater than the lead angle of the internal thread.

2. The method of claim 1, wherein said dressing step includes maintaining the axis of the profiling roll in a horizontal plane.

3. The method of claim 1, wherein said maintaining step includes locating the axis of the workpiece in a horizontal plane.

* * * * *